United States Patent
Ryan et al.

(10) Patent No.: US 7,469,923 B2
(45) Date of Patent: Dec. 30, 2008

(54) SIDE AIRBAG AND METHOD OF MANUFACTURE

(75) Inventors: Shawn G. Ryan, Dayton, OH (US); Margaret Fisher, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 377 days.

(21) Appl. No.: 10/914,884

(22) Filed: Aug. 10, 2004

(65) Prior Publication Data

US 2006/0033318 A1 Feb. 16, 2006

(51) Int. Cl.
*B60R 21/16* (2006.01)
(52) U.S. Cl. ................................. 280/730.2
(58) Field of Classification Search .............. 280/730.2, 280/743.1
See application file for complete search history.

(56) References Cited

U.S. PATENT DOCUMENTS

| | | | | |
|---|---|---|---|---|
| 5,556,127 A | 9/1996 | Hurford et al. | ........... | 280/730.2 |
| 5,573,271 A | 11/1996 | Headley | ........... | 280/741 |
| 5,839,751 A | 11/1998 | Lutz | ........... | 280/728.2 |
| 5,868,421 A | 2/1999 | Eyrainer | ........... | 280/730.2 |
| 6,168,186 B1 | 1/2001 | Welch et al. | ........... | 280/728.2 |
| 6,293,581 B1 | 9/2001 | Saita et al. | ........... | 280/730.2 |
| 6,386,581 B1 | 5/2002 | Ohno | ........... | 280/735 |
| 6,485,048 B2 | 11/2002 | Tajima et al. | ........... | 280/728.2 |
| 6,502,853 B2* | 1/2003 | Keshavaraj | ........... | 280/729 |
| 6,517,104 B1 | 2/2003 | Patel | ........... | 280/730.2 |
| 6,543,804 B2 | 4/2003 | Fischer | ........... | 280/730.2 |
| 6,588,793 B2 | 7/2003 | Rose | ........... | 280/728.2 |
| 6,595,546 B2* | 7/2003 | Smith | ........... | 280/736 |
| 6,601,871 B2 | 8/2003 | Fischer | ........... | 280/730.2 |
| 6,695,341 B2 | 2/2004 | Winarto et al. | ........... | 280/730.2 |
| 6,749,216 B2 | 6/2004 | Tanase et al. | ........... | 280/730.2 |
| 6,890,001 B1 | 5/2005 | Smith | ........... | 280/736 |
| 2002/0070537 A1 | 6/2002 | Webber et al. | ........... | 280/730.2 |
| 2003/0052477 A1* | 3/2003 | Challa et al. | ........... | 280/730.2 |
| 2003/0075906 A1 | 4/2003 | Inoue et al. | ........... | 280/730.2 |
| 2003/0164607 A1 | 9/2003 | Ronne et al. | ........... | 280/728.2 |
| 2003/0234523 A1* | 12/2003 | Henderson et al. | ........... | 280/730.2 |
| 2004/0017067 A1* | 1/2004 | Daines et al. | ........... | 280/730.2 |
| 2005/0046154 A1 | 3/2005 | Rhea et al. | ........... | 280/728.2 |
| 2005/0280249 A1* | 12/2005 | Gorecki et al. | ........... | 280/730.2 |

* cited by examiner

*Primary Examiner*—Paul N. Dickson
*Assistant Examiner*—Robert A. Coker
(74) *Attorney, Agent, or Firm*—Douglas D Fekete

(57) ABSTRACT

An inflatable cushion and method of making an inflatable cushion for deployment along an interior side of a vehicle, comprising: a first inflatable portion having an opening providing fluid communication into a low permeable inflation chamber of the first inflatable portion; a second inflatable portion having an opening providing fluid communication into a low permeable inflation chamber of the second inflatable portion; a fluid dispersing conduit being in fluid communication with the first inflatable portion and the second inflatable portion, the fluid dispersing conduit comprising an inlet opening configured to receive an inflation force for inflating the first inflatable portion and the second inflatable portion, wherein the fluid dispersing conduit traverses a gap between the first inflatable portion and the second inflatable portion; and a non-inflatable member disposed in the gap between the first inflatable portion and the second inflatable portion, wherein the non-inflatable member reduces the required size of the first inflatable portion and the second inflatable portion.

15 Claims, 3 Drawing Sheets

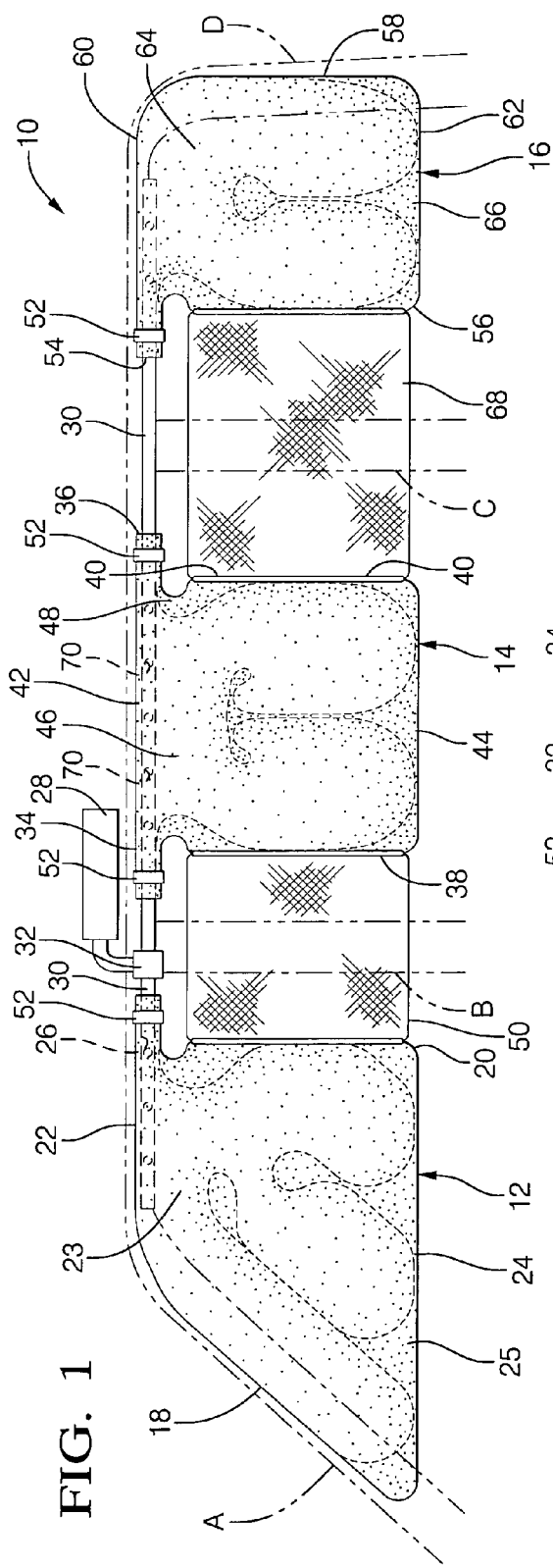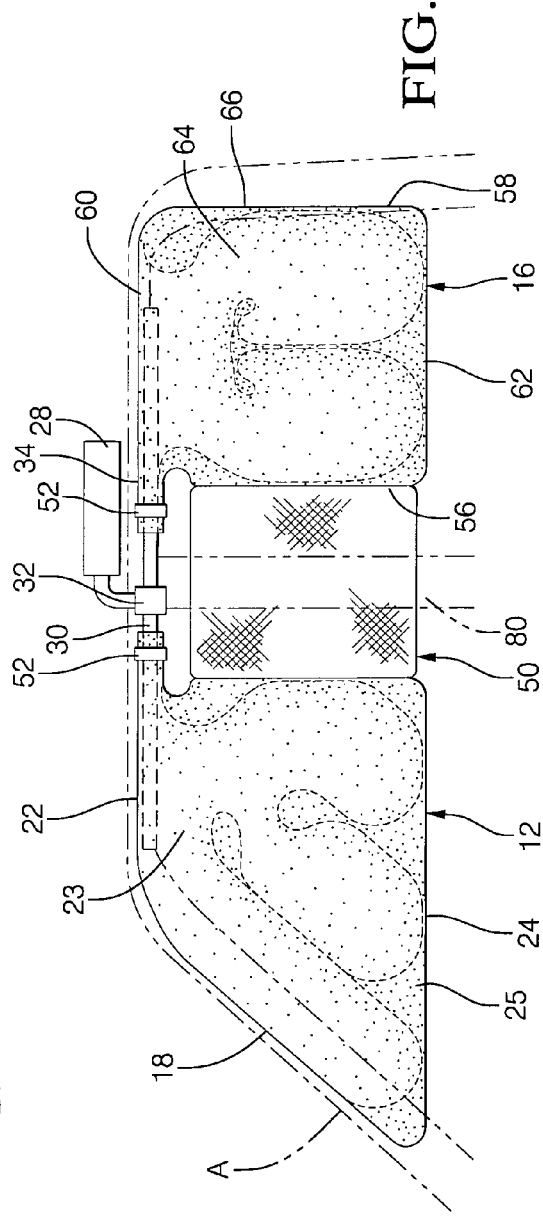

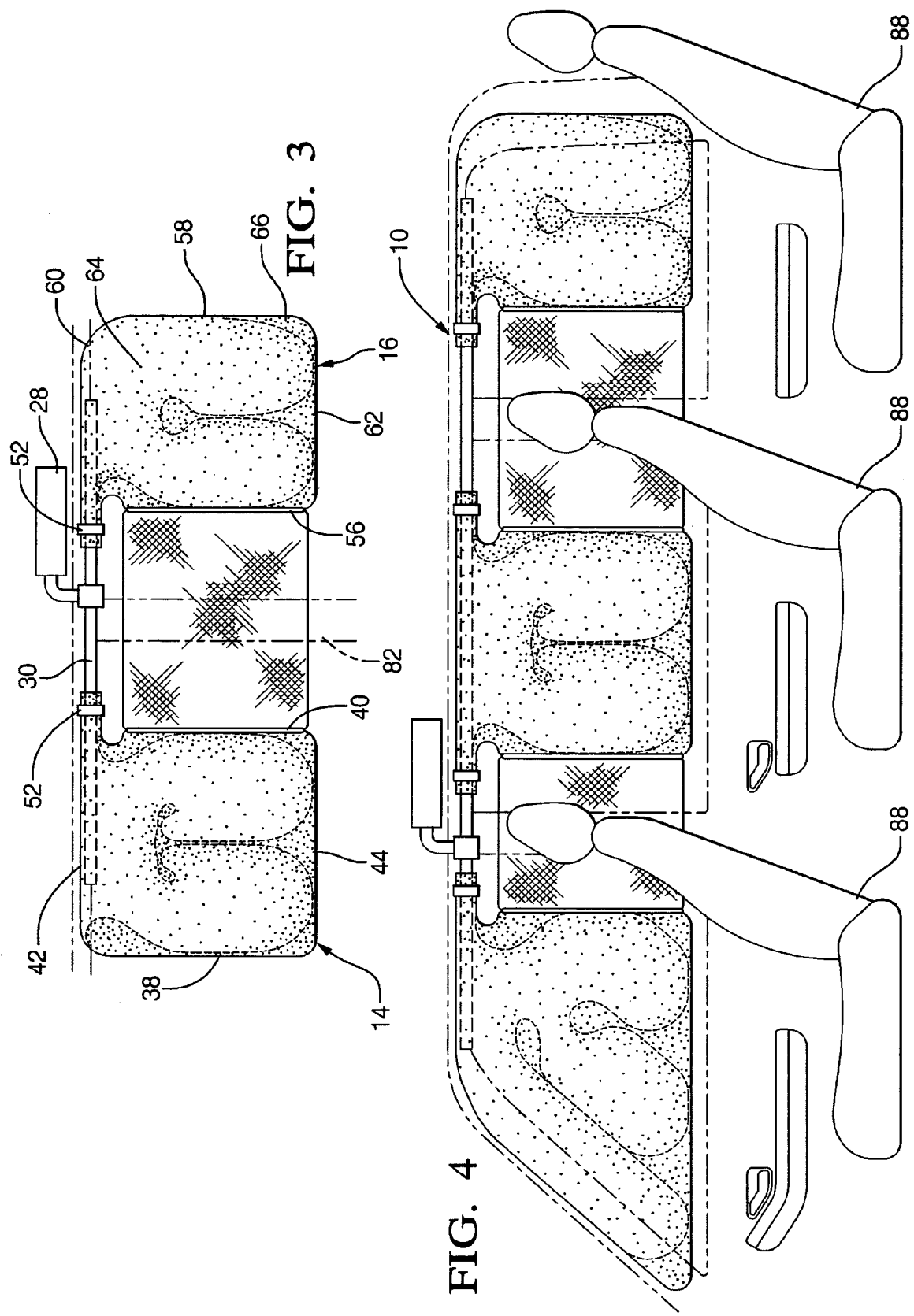

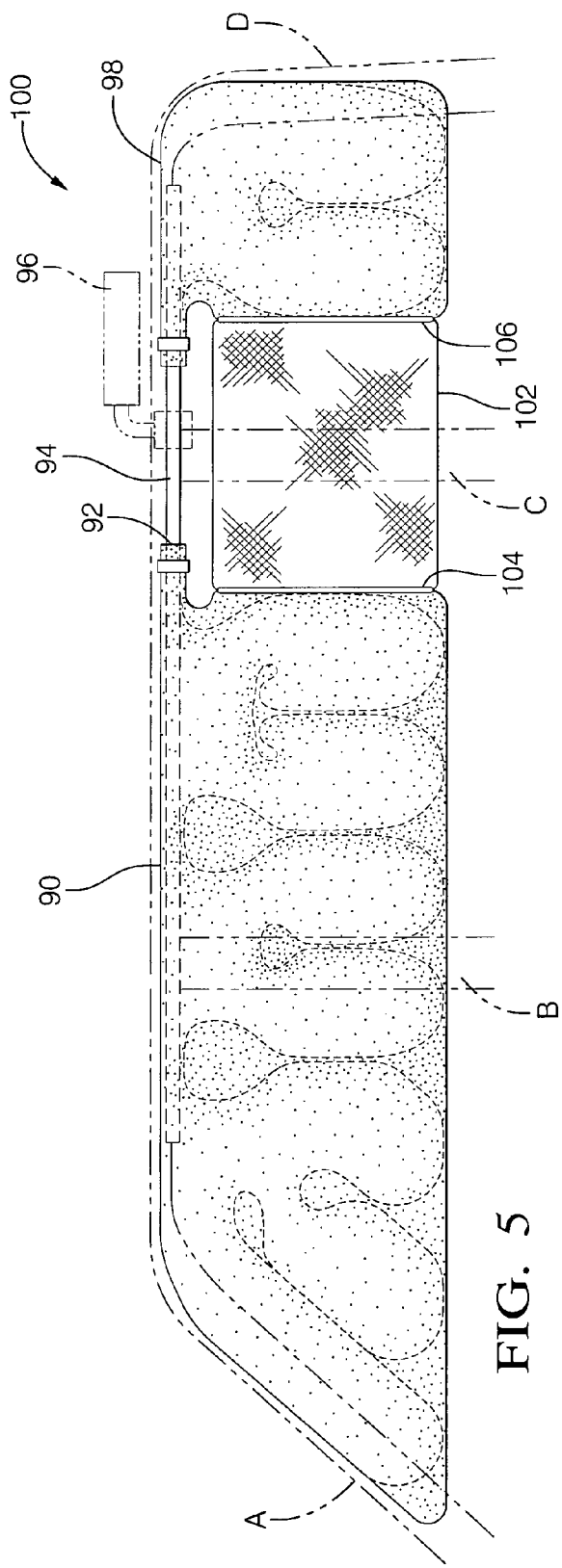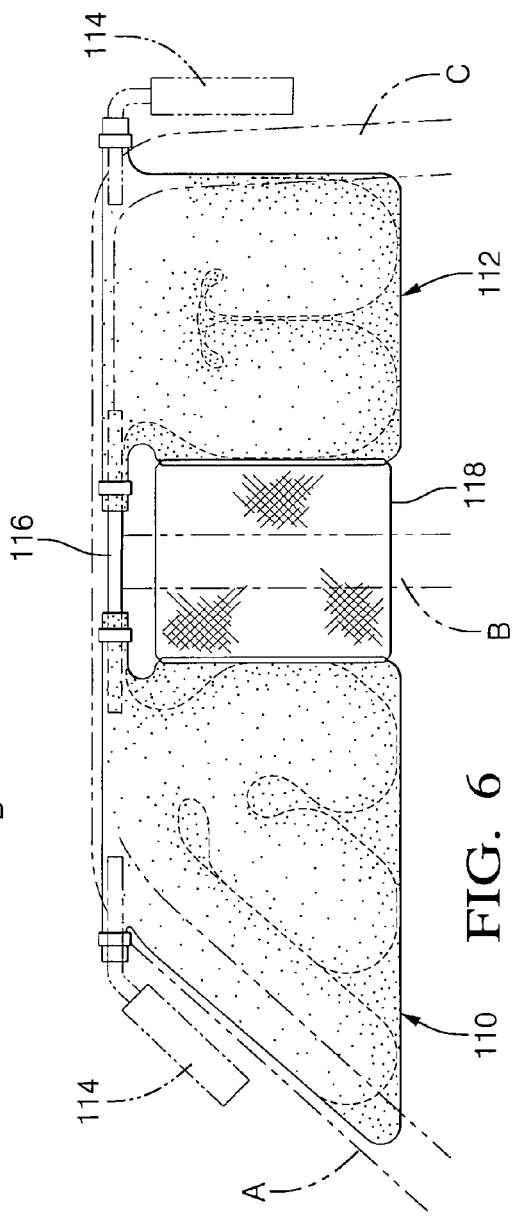

SIDE AIRBAG AND METHOD OF MANUFACTURE

TECHNICAL FIELD

The present invention relates to side airbag devices and more particularly the present invention relates to an inflatable cushion and method of manufacture.

BACKGROUND

Some vehicles are supplied with side airbag devices. Generally the device is located along a side of the vehicle and deploys an inflatable curtain in accordance with a predetermined activation occurrence. The side impact air bags or inflatable cushions are often mounted in close proximity to the vehicle's roof rail, doorframe or center pillars, or in some instances within the side door. Accordingly, the space or housing for the un-inflated airbag is compact and extends or traverses along the window area or frame, as the airbag cannot be installed in the areas comprising the window. Moreover, it is also desirable to have the inflatable cushion disposed behind a decorative trim portion of the vehicle's interior. Thus, the presence of the side airbag device is not observable to occupants when it is in its un-deployed state.

When the air bag or inflatable cushion is mounted to the vehicle the top edge portion is fixed and a lower edge portion, which defines the bottom periphery of the airbag, deploys out of the storage location positioned in close proximity to the roof rail. Furthermore, and referring in particular to larger or longer vehicles (e.g., sports utility vehicles, vans, mini-vans, station wagons, etc.) a single side air bag or inflatable cushion that extends from the A pillar to the D pillar, or further, of the vehicle has to have an extended length to cover the side areas of the vehicle. Accordingly, these extended inflatable cushions require additional inflator output in order to inflate and maintain the inflation of the cushion for a pre-determined period of time.

In addition, and due to the location of deployment of these cushions (e.g., vehicle side, A-D pillars) it is desirable to provide these cushions with an extended period of inflation. Moreover, and depending on the vehicle type other areas of the cushion that traverse across the interior of the vehicle (e.g., between doors) may not require inflation. However, these areas still comprise a portion of the inflatable cushion. The required extended period of inflation may comprise up to and exceeding five seconds. These extended periods of inflation allow the inflatable cushion to provide a retentive barrier across the opening of the windows of the vehicle. In order to provide inflation cushions which retain their inflation gases for extended periods of time the cushion in one configuration is provided with sealed seams in accordance with U.S. Pat. No. 6,220,309, the contents of which are incorporated herein by reference thereto. Alternatively, sealed cushions are provided by disposing sealing material such as silicone between the edges of two sheets of fabric members comprising the inflatable cushion. In addition, these types of cushions (e.g., less permeable cushions or cushions that retain inflation gases for extended periods of time) are expensive to manufacture. Accordingly, side impact inflation cushions become larger in order to cover extended lengths and their associated costs increase.

Accordingly, it is desirable to provide a cost-efficient sealed inflatable cushion that is capable of staying inflated for an extended period of time as well as being able to traverse and extend the length of the vehicle.

SUMMARY OF THE INVENTION

This disclosure relates to a side airbag and method for making. In an exemplary embodiment, an inflatable cushion and method of making an inflatable cushion for deployment along an interior side of a vehicle is disclosed. The inflatable cushion comprising: a first inflatable portion having an opening providing fluid communication into a low permeable inflation chamber of the first inflatable portion; a second inflatable portion having an opening providing fluid communication into a low permeable inflation chamber of the second inflatable portion; a fluid dispersing conduit being in fluid communication with the first inflatable portion and the second inflatable portion, the fluid dispersing conduit being configured to allow an inflation force to inflate the first inflatable portion and the second inflatable portion, wherein the fluid dispersing conduit traverses a gap between the first inflatable portion and the second inflatable portion; and a non-inflatable member disposed in the gap between the first inflatable portion and the second inflatable portion, wherein the non-inflatable member reduces the required size of the first inflatable portion and the second inflatable portion.

An inflatable cushion for deployment along an interior side of a vehicle, comprising: a first inflatable portion having an opening providing fluid communication into the first inflatable portion, the first inflatable portion being a one-piece woven construction; a second inflatable portion having a pair of openings providing fluid communication into the second inflatable portion, the second inflatable portion being a one-piece woven construction; a third inflatable portion having an opening providing fluid communication into the third inflatable portion, the third inflatable portion being a one-piece woven construction; a fluid dispersing conduit being in fluid communication with the first inflatable portion, the second inflatable portion and the third inflatable portion, the fluid dispersing conduit comprising an inlet opening configured to receive an inflation force for inflating the first inflatable portion, the second inflatable portion and the third inflatable portion, wherein the fluid dispersing conduit traverses a gap between the first inflatable portion and the second inflatable portion and a gap between the second inflatable portion and the third inflatable portion; a first non-inflatable member disposed in the gap between the first inflatable portion and the second inflatable portion; and a second non-inflatable member disposed in the gap between the second inflatable portion and the third inflatable portion.

A modularly constructed inflatable cushion for deployment along an interior side of a vehicle, comprising: a first one-piece woven inflatable portion having at least one opening providing fluid communication into the first inflatable portion; a second one-piece woven inflatable portion having at least one opening providing fluid communication into the second inflatable portion; and a fluid dispersing conduit being in fluid communication with the first inflatable portion and the second inflatable portion, the fluid dispersing conduit comprising an inlet opening configured to receive an inflation force for inflating the first inflatable portion and the second inflatable portion, wherein the fluid dispersing conduit traverses a gap between the first inflatable portion and the second inflatable portion; and a non-inflatable member disposed in the gap between the first one-piece woven inflatable portion and the second one-piece woven inflatable portion, wherein the non-inflatable member reduces the size of the first inflatable portion and the second inflatable portion according to the size of the non-inflatable member.

A method for modularly constructing an inflatable cushion for deployment along an interior side of a vehicle, comprising: providing a first one-piece woven inflatable portion having at least one opening providing fluid communication into the first inflatable portion, the first one-piece woven inflatable portion being constructed by a separate manufacturing process than the assembly of the inflatable cushion; providing a second one-piece woven inflatable portion having at least one opening providing fluid communication into the second inflatable portion, the second one-piece woven inflatable portion being constructed by a separate manufacturing process than the assembly of the inflatable cushion; disposing a fluid dispersing conduit between the first inflatable portion and the second inflatable portion, the fluid dispersing conduit being configured to receive an inflation force for inflating the first inflatable portion and the second inflatable portion, wherein the fluid dispersing conduit traverses a gap between the first inflatable portion and the second inflatable portion; and securing a non-inflatable member in the gap between the first one-piece woven inflatable portion and the second one-piece woven inflatable portion, wherein the size of first inflatable portion and the second inflatable portion is reduced according to the size of the non-inflatable member.

A method for modularly constructing an inflatable cushion for deployment along an interior side of a vehicle, comprising: providing a first one-piece woven inflatable portion having an opening for providing fluid communication into the first inflatable portion, the first one-piece woven inflatable portion being constructed by a separate manufacturing process than the assembly of the inflatable cushion; providing a second one-piece woven inflatable portion having a pair of openings providing fluid communication into the second inflatable portion, the second one-piece woven inflatable portion being constructed by a separate manufacturing process than the assembly of the inflatable cushion; providing a third one-piece woven inflatable portion having at least one opening providing fluid communication into the third one-piece inflatable portion, the third one-piece woven inflatable portion being constructed by a separate manufacturing process than the assembly of the inflatable cushion; and securing the first one-piece woven inflatable portion, the second one-piece woven inflatable portion and the third one-piece woven inflatable portion to each other by disposing a fluid dispersing conduit between the opening of the first inflatable portion, the pair of openings of the second one-piece woven inflatable portion and the opening of the third one-piece woven inflatable portion, the fluid dispersing conduit being configured to receive an inflation force for inflating the first one-piece woven inflatable portion, the second one-piece woven inflatable portion and the third one-piece woven inflatable portion, wherein the fluid dispersing conduit traverses a first gap between the first one-piece woven inflatable portion and the second one-piece woven inflatable portion and the fluid dispersing conduit traverses a second gap between the second one-piece woven inflatable portion and the third one-piece woven inflatable portion, and by securing a first non-inflatable member in the first gap between the first one-piece woven inflatable portion and the second one-piece woven inflatable portion and by securing a second non-inflatable member in the second gap between the second one-piece woven inflatable portion and the third one-piece woven inflatable portion, wherein the size of the first inflatable portion, the second inflatable portion and the third inflatable portion are reduced according to the size of the first non-inflatable member and the second non-inflatable member.

BRIEF DESCRIPTION OF THE DRAWINGS

FIG. 1 is a side view of an inflatable cushion constructed in accordance with an exemplary embodiment of the present invention;

FIG. 2 is a side view of an inflatable cushion constructed in accordance with another exemplary embodiment of the present invention;

FIG. 3 is a side view of an inflatable cushion constructed in accordance with yet another exemplary embodiment of the present invention;

FIG. 4 is a side view of the inflatable cushion of FIG. 1 illustrating the deployed configuration in a vehicle; and FIGS. 5 and 6 are side views of inflatable cushions constructed in accordance with other exemplary embodiments of the present invention.

DETAILED DESCRIPTION OF EXEMPLARY EMBODIMENTS

This disclosure relates to an inflatable cushion and method of manufacture wherein the cushion has separate cushion sections that are manufactured separately and assembled together to provide an extended inflatable cushion, which is less expensive to manufacture as areas not requiring inflation are not covered by inflatable portions of the cushion, which typically add to the related manufacturing costs. In one exemplary embodiment separate cushion sections are manufactured for assembly into various configurations for use in various vehicles having various sizes and configurations.

The fabric used for the inflatable cushion in airbag modules is a significant portion of the total cost for the module. This is especially true for curtain airbags due to the large size of the cushion. It is further magnified on systems employing low-permeability fabrics and sealed seams in order to provide longer inflation periods without increasing the size of the inflator to provide a longer duration output to overcome the loses of the gases from the cushion. One piece woven constructions are desired due to the retention capabilities. An example of such construction is found in U.S. Pat. No. 6,220,309 the contents of which are incorporated herein by reference thereto. However, for very large cushions the cost is again increased because it can be difficult to package several cushions side-by-side on the fabric roll.

Often, the curtain cushions have large un-inflated regions. These areas correspond typically to the areas between seats where occupant protection is not required. In order to minimize the cost of the cushion a composite construction method is proposed. This method would allow the un-inflated regions to be made of a low-cost material that could then be attached to the one-piece woven sections or more expensive sections. The one-piece woven sections would be smaller and therefore result in more efficient nesting of the patterns on the sheets of material used for the inflatable cushions thus, less material waste is caused by smaller cushion sizes as they provide greater availability of orientations on a piece of material of a given size. In other words by reducing the size of the cushion the smaller cushions are able to be orientated in various positions on a standard sheet (limited by manufacturing constraints) of the material used for the inflatable cushion thus, the multiple cushions may be placed on a single sheet in various orientations to limit waste materials. A single inflator would be used and the gas would be delivered to the inflatable, one-piece woven sections using a diffuser tube. Additional clamps and additional assembly steps will be required. However, the savings in one-piece woven material would be large enough to result in a significant overall net savings. Accordingly, separate inflatable one-piece woven sections are provided and subsequently attached to each other with non-inflatable panels.

In addition to the material savings, exemplary embodiments of the present invention provide other benefits. For certain vehicles, such as trucks, numerous body styles are offered and each style may require a curtain airbag of a unique configuration. Exemplary embodiments of the present invention allow the curtain designed for such vehicles to be modular. For example, an A to C pillar curtain for one body style can be easily converted to an A to D pillar curtain using this method with an appropriate increase in the inflator output and modification to the diffuser tube.

Referring now to FIG. 1, an airbag or inflatable cushion 10 constructed in accordance with exemplary embodiments of the present invention is illustrated. As illustrated, inflatable cushion 10 is manufactured and constructed in order to traverse from the A pillar to a D pillar of a vehicle, as illustrated by the dashed lines in FIG. 1. It is, of course, understood that inflatable cushion 10 is configurable to cover other arrangements (e.g., A pillar to B pillar, A pillar to C pillar and B pillar to C pillar etc.). In one exemplary embodiment separate cushion sections are manufactured for assembly into various configurations for use in various vehicles having numerous size configurations. These sections comprise the inflatable portions, which comprise the more expensive portions or materials of the inflatable cushion.

As illustrated, inflatable cushion 10 comprises a first forward section 12, a second section 14 and a third rear section 16. First section 12 comprises a forward leading edge 18, a rearward edge 20, an upper portion 22 and a lower edge 24. In accordance with an exemplary embodiment, the leading edge 18 is configured to have an angled portion that traverses towards the vehicle windshield. It is also noted that sections 14 and 16 may also be configured to have angled sections or alternatively a pair of sections 12 may be combined with section 14 thus angled portions will be at either end of the cushion. These various configurations allow the assembled cushion to be used with various vehicle configurations. In an exemplary embodiment section 12 also comprises inflatable portions 23 and un-inflatable portions 25. The un-inflatable portions are positioned in areas not requiring inflation thus, the inclusion of un-inflatable portions 25 will reduce the inflator output required to inflate the section. In addition, the un-inflatable portions may also be configured to assist in deployment of the section or the inflatable cushion and a particular direction.

In order to provide first section 12 with inflation output from an inflator, an inflation opening 26 is in fluid communication with inflatable portions 23. An inflator 28, in accordance with technologies known to those skilled in the art, provides an inflation output to inflation opening 26 via one end of a fluid dispersing conduit 30. In accordance with an exemplary embodiment, fluid dispersing conduit 30 comprises rigid tubing such as a PVC pipe or metal pipe or conduit. Fluid dispersing conduit 30 comprises a fluid inlet 32 that provides fluid communication between an outlet opening of the inflator 28 and fluid dispersing conduit 30. It is, of course, understood and as applications may vary, the positioning of the inflator may be located in other positions than those illustrated in the drawings. For example, the inflator may be located in a forward vehicle position. Thus, the presented location is provided as an example and the present invention is not intended to be limited by the same. In yet another alternative, the inflator may be remotely located and a conduit or other fluid providing means is used to supply the inflating gas from the inflator to the inflatable cushion.

At another end of fluid dispersing conduit 30 a first inflation opening 34 of a forward end 38 of second section 14 is in fluid communication with fluid dispersing conduit 30. In the embodiment of FIG. 1, second section 14 also comprises a rearward edge 40, an upper edge 42 and a lower edge 44. Similar to first section 12, second section 14 comprises inflatable portions 46 and un-inflatable portions 48.

As illustrated in FIG. 1 an un-inflated single layer section 50 is disposed between rearward edge 20 of first section 12 and forward edge 38 of second section 14. In accordance with an exemplary embodiment section 50 may comprise a single layer of fabric or alternatively, a layer of webbing or net that will traverse the expanse between the two sections. In an exemplary embodiment, un-inflated single layer section 50 comprises a portion of the inflatable cushion 10, which traverses an area not requiring an inflatable cushion e.g., the area of the cushion which will traverse across the B pillar of the vehicle or portion of the vehicle that is between the doors and accordingly the seats of the vehicle. Accordingly, and through the use of uninflated section 50 the overall amount of material required for inflatable portions of the inflatable cushion is reduced thereby reducing the overall cost of the inflatable cushion. In addition, the configurations of first section 12 and second section 14 allow the same to be manufactured in separate manufacturing steps, which allows for modular construction of the inflatable cushion wherein uninflated section 50 and fluid dispersing conduit are secured to first section 12 and second section 14 during separate manufacturing steps, which can be performed at separate manufacturing facilities.

Furthermore, by reducing the size of the inflatable sections being constructed the costs and difficulties associated with manufacturing the inflatable sections is reduced since separate sections of smaller size are constructed first and then assembled together.

In order to provide a robust securement about fluid dispersing conduit 30 a securement means 52 is provided to secure a portion of the inflatable sections about fluid dispersing conduit 30. A non-limiting example of securement means 52 is a band clamp. Other contemplated means include, adhesives and/or welding techniques.

In a similar fashion a fluid dispersing conduit 30 provides fluid communication between second inflation opening 36 and an inflation opening 54 of rear section 16. Similarly to the other sections, rear section 16 has a forward leading edge 56, a rearward edge 58, an upper edge 60 and a lower edge 62. Section 16 also comprises inflatable portions or chambers 64 and non-inflatable portions 66. In accordance with an exemplary embodiment rearward edge 58 is configured to match a profile of a rearward portion of the vehicle. An un-inflated single layer section 68 is disposed between rearward edge 40 of second section 14 and forward edge 56 of third section 16.

In an exemplary embodiment, un-inflated single layer section 68 comprises a portion of the inflatable cushion 10, which traverses an area not requiring an inflatable cushion, e.g., the area of the cushion, which will traverse across the C pillar of the vehicle and correspond to a location not adjacent to a seat of the vehicle thus, an area not requiring an inflatable section. Un-inflated single layer section 68 is secured to rearward edge 40 of second section 14 and forward edge 56 of third section 16 via stitching or welding or other equivalent securement means during an assembly step when cushion 10 is assembled.

Accordingly, and through the use of uninflated section 68 the overall amount of material required for inflatable portions of the inflatable cushion is further reduced thereby reducing the overall cost of the inflatable cushion. Thus, the extended length of cushion 10 is provided with limited materials for the inflatable sections.

In addition, the configurations of second section 14 and third section 16 allow the same to be manufactured in separate manufacturing steps, which allows for modular construction of the inflatable cushion wherein uninflated section 68 and fluid dispersing conduit are secured to second section 14 and third section 16 during separate manufacturing steps, which can be performed at separate manufacturing facilities.

Again, and in order to provide securement about the fluid dispersing conduit a securement means 52 is provided to secure a portion of the inflatable sections about the fluid dispersing conduit. In an exemplary embodiment, fluid dispersing conduit 30 comprises a single elongated member traversing from first section 12 through second section 14 and ultimately into third section 16. In this configuration, fluid dispersing conduit 30 comprises an elongated conduit open at either end (e.g., first section and third section) with a plurality of diffuser openings 70 in a middle portion corresponding to a portion of the conduit disposed within second section 14. In this embodiment and during assembly fluid dispersing conduit 30 is slid into second section 14 with a portion protruding on either side, which is then inserted into the first and third sections. Accordingly, and when an inflation output is provided to fluid dispersing conduit 30 inflation of the inflatable portions of first section 12, second section 14 and third section 16 is provided through the fluid communication between inflator 28 and fluid dispersing conduit 30.

In an alternative embodiment, a first fluid dispersing conduit is positioned between first section 12 and second section 14 while a second fluid dispersing conduit is disposed between second section 14 and third section 16. Fluid communication between the first and second conduit is provided vis-à-vis the inflatable portions of second section 14. Also, and in an alternative embodiment, a second inflator may be in fluid communication with the conduit disposed between second section 14 and third section 16.

Furthermore, fluid dispersing conduit 30 also provides a means for securement of inflatable cushion 10 to the vehicle as fluid dispersing conduit 30 will comprise a more rigid member than the top edges of the inflatable sections. For example, securing members may be secured to the fluid dispersing conduit between the inflatable sections.

It is also understood that the configuration of the inflatable cushion may vary and the illustrations of the sections in the Figures are provided as examples and the present invention is not intended to be limited to the specific configurations provided in the figures, as they are considered ancillary to the present invention.

Moreover, the present invention is contemplated for use with numerous other vehicle configurations. For example, the vehicle may include three rows of seats; such vehicles include but are not limited to sports utility vehicles, station wagons, vans or minivans. Conversely, the vehicle may comprise only a single row of seats such vehicles include but are not limited to sports coups.

An example of the inflatable sections of an inflatable cushion of exemplary embodiments of the present invention are constructed from all-woven inflatable fabrics which comprise areas of two layers and attachment points or "seams" where single layers of fabric are formed. Such single fabric layers are constructed solely through the utilization of basket weave patterns. These specific single fabric layers provide a relatively effective manner of reducing air permeability within the entire fabric article by decreasing the possibility of yarn shifting upon inflation of the inflatable fabric. A teaching of such an inflatable cushion is found in U.S. Pat. No. 6,220,309 the contents of which are incorporated herein by reference thereto.

The inflatable cushion may also be made of any suitable air bag material for holding gas. In an exemplary embodiment, the inflatable cushion comprises two sheets of woven nylon fabric lined with urethane or other substantially impervious material such as silicone. The two urethane coated nylon sheets are secured to one another along an outer periphery thereof to define the overall inflatable section shape. As discussed above, the configurations of the inflatable sections for holding the inflatable gas are more expensive than the non-inflatable sections (50, 68) and larger inflatable sections are harder to manage on the machinery (e.g., looms) used to stitch or secure the materials together.

Prior to deployment, the inflatable cushion is stored in a compartment mounted to the roof rail or proximate to the roof rail. In order to store the airbag into the compartment the un-inflated airbag is folded into a configuration which allows it to occupy a small discrete area within the vehicle interior. In accordance with exemplary embodiments of the present invention, the inflatable cushion is folded by a machine in order to provide the configurations disclosed herein. It is also possible to fold the inflatable cushion by hand.

When a predetermined activation event or occurrence is detected, the inflatable cushion is inflated by gas from the inflator. In general, the inflator will receive an inflation or deployment signal that causes the inflator to generate an inflation gas or inflation output for inflating the inflatable cushion. In an exemplary embodiment, the deployment signal is generated by a controller, such as a microcontroller of a sensing and diagnostic module configured for use with the airbag module. The sensing and diagnostic module receives a plurality of signals from appropriate sensing devices (e.g., door mounted accelerometers), and will generate a deployment signal if a predetermined activation event has been sensed. FIG. 4 illustrates a non-limiting example of a deployed configuration of inflatable cushion 10 within a vehicle, wherein vehicle seats 88 are illustrated.

Referring now to FIG. 2, an alternative exemplary embodiment of the present invention is illustrated. In this embodiment cushion 10 is designed for vehicles having a shorter length than the vehicles contemplated for use with the cushion of FIG. 1. Here inflatable cushion 10 comprises two inflatable sections, which are separately manufactured and assembled together. In the illustrated embodiment first section or forward section 12 is secured to a rear section 16. As shown first section 12 is in fluid communication with rear section 16 via a fluid dispersing conduit 30. Similar to the previous embodiment, a non-inflated section 50 is positioned such that the non-inflatable portion of the inflatable cushion is located about a pillar 80 (illustrated by dashed lines) of the vehicle. As shown, non-inflated section 50 is disposed between a rearward edge 20 of section 12 and a forward edge 56 of section 16. Similar to the previous embodiment, sections 12 and 16 comprise inflated portions and un-inflated portions.

Of particular importance is that sections 12 and 16 of FIG. 1 may be used to provide the smaller cushion illustrated in FIG. 2. Accordingly, and in accordance with exemplary embodiments of the present invention, the sections manufactured comprise configurations that are usable in multiple designs. For example, the comparison between FIGS. 1 and 2 provides one non-limiting example. Here numerous smaller inflatable sections (e.g., sections 12, 14 and 16) are separately manufactured wherein the related manufacturing costs are reduced due to the amount of materials used and ease of maneuvering on the looms. Thereafter, inflatable cushions are manufactured by selecting one or more of the individual sections for use in manufacturing of a larger cushion wherein the non-inflatable sections are disposed therebetween. In similar fashion an inflator 28 is in fluid communication with fluid dispersing conduit 30, which is sealing secured within inflation openings of the inflatable sections.

Referring now to FIG. 3, another alternative exemplary embodiment of the present invention is illustrated. In this embodiment cushion 10 is designed for vehicles having a shorter length than the vehicles contemplated for use with the cushion of FIG. 1. Here inflatable cushion 10 comprises two inflatable sections, which are separately manufactured and assembled together. In the illustrated embodiment, section 14 is secured to rear section 16. As shown, section 14 is in fluid communication with rear section 16 via a fluid dispersing conduit 30. Similar to the previous embodiment, a non-inflated section 68 is positioned such that the non-inflatable portion of the inflatable cushion is located about a pillar 82 (illustrated by dashed lines) of the vehicle. As shown non-inflated section 68 is disposed between a rearward edge 40 of section 14 and a forward edge 56 of section 16. Similar to the previous embodiment, sections 12 and 16 comprise inflated portions and un-inflated portions. Here it is illustrated that sections 12 and 16 each have a square or box like configuration further illustrating the flexibility of designs achievable through several inflatable sections each being separately manufactured.

Referring now to FIG. 5, another alternative exemplary embodiment of the present invention is illustrated. In this embodiment a forward cushion portion 90 is designed to cover an area comprising the A, B and C pillars of a vehicle having a particular configuration wherein inflation gases are provided via an inflation opening 92 positioned at one end of the cushion portion. As discussed herein a conduit 94 will provide a means for providing fluid communication to the interior portions of the forward cushion portion wherein the inflation output of an inflator 96 is provided therein. Thus, cushion 90 may be provided for certain vehicles wherein the cushion extends from one portion of the vehicle to the other. As contemplated herein cushion 90 alone is configured for use in a vehicle having only an A, B and C pillar. However for vehicles having a longer length and thus further comprising a "D" pillar cushion portion 90 is capable of being connected to another inflatable cushion portion 98 that would now provide a cushion 100 capable of use with vehicles having longer lengths. Here inflatable cushion 100 comprises two inflatable sections (90 and 98), which are separately manufactured and assembled together. In the illustrated embodiment section 90 is secured to section 98. As shown the two sections are in fluid communication with each other via a fluid dispersing conduit 94 and a non-inflated section 102 is positioned such that the non-inflatable portion of the inflatable cushion is located about a "C" pillar (illustrated by dashed lines) of the vehicle. As shown non-inflated section 102 is disposed between a rearward edge 104 of section 90 and a forward edge 106 of section 98. In this embodiment, a single inflatable cushion 90 configured for use in smaller vehicles can now also be expanded via sections 102 and 98 to also be used for larger vehicles wherein non-inflatable section 102 limits the amount of expensive materials to be used. Thus, cushion portion 90 is capable of being manufactured with one configuration while also being capable for being used in various vehicles of different sizes.

Referring now to FIG. 6, another alternative exemplary embodiment of the present invention is illustrated. In this embodiment a forward cushion portion 110 is designed to cover an area comprising the A and B pillars of a vehicle while a rear cushion portion 112 is designed to cover an area comprising the B and C pillars of the vehicle particular wherein inflation gases are provided via at least one inflation opening positioned at one end of the cushion portions wherein an inflator 114 is in fluid communication with the interiors of the inflatable cushion portions and inter cushion fluid communication is provided by a conduit 116. Similar to the previous embodiments, a non-inflated section 118 is positioned such that the non-inflatable portion of the inflatable cushion is located about the B pillar (illustrated by dashed lines) of the vehicle.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflatable cushion for deployment along an interior side of a vehicle, comprising:
    a first inflatable portion having an opening providing fluid communication into a low permeable inflation chamber of said first inflatable portion;
    a second inflatable portion having an opening providing fluid communication into a low permeable inflation chamber of said second inflatable portion;
    a fluid dispersing conduit comprising a rigid tubular member connecting the opening of said first inflatable portion and the opening of said second inflatable portion, said fluid dispersing conduit comprising an inlet opening configured to receive an inflation force for inflating said first inflatable portion and said second inflatable portion, said fluid dispersing conduit traverses a gap between said first inflatable portion and said second inflatable portion; and
    a non-inflatable member disposed in said gap between said first inflatable portion and said second inflatable portion, wherein the first inflatable portion and the second inflatable portion are only secured to each other by the non-inflatable member and the fluid dispersing conduit, wherein said first inflatable portion has a forward leading edge and a rearward edge and said second inflatable portion has a forward leading edge and a rearward edge, wherein said rearward edge of said first inflatable portion and said forward leading edge of said second inflatable portion are in a facing spaced relationship when the inflatable cushion is inflated and said non-inflatable member being disposed along substantially all of the rearward edge of the first inflatable portion and along substantially all of the forward leading edge of the second inflatable portion:
    wherein a portion of said first inflatable portion proximate to said opening is sealingly engaged about a portion of said fluid dispersing conduit by a clamp and a portion of said second inflatable portion proximate to said opening is sealingly engaged about another portion of said fluid dispersing conduit by another clamp.

2. The inflatable cushion as in claim 1, wherein said non-inflatable member is a single layer of fabric material.

3. The inflatable cushion as in claim 1, wherein said non-inflatable member is a single layer of fabric material and the inflatable cushion is configured such that said non-inflatable member traverses a pillar of the vehicle and said first inflatable portion and said second inflatable portion traverse window openings of the vehicle.

4. The inflatable cushion as in claim 1, wherein said first inflatable portion has non-inflatable portions defining a plurality of low permeable inflation chambers each being in fluid communication with each other and said second inflatable portion has non-inflatable portions defining a plurality of low permeable inflation chambers each being in fluid communication with each other.

5. The inflatable cushion as in claim 4, wherein said first inflatable portion is a one-piece woven construction and said second inflatable portion is a one-piece woven construction.

6. The inflatable cushion as in claim 1, wherein said first inflatable portion comprises a pair of fabric materials sewn to each other, wherein a silicon sealing material is disposed between said pair of fabric materials defining a seam of said low permeable inflation chamber and wherein said second inflatable portion comprises a pair of fabric materials sewn to each other, wherein a silicon sealing material is disposed between the said pair of fabric materials defining a seam of said low permeable inflation chamber of said second inflatable portion.

7. The inflatable cushion as in claim 1, wherein said first inflatable portion is a one-piece woven construction and said second inflatable portion is a one-piece woven construction.

8. The inflatable cushion as in claim 1, wherein said rigid tubular member is formed of a PVC pipe or a metal pipe.

9. An inflatable cushion for deployment along an interior side of a vehicle, comprising:
   a first inflatable portion having an opening providing fluid communication into said first inflatable portion, said first inflatable portion being a one-piece woven construction;
   a second inflatable portion having a pair of openings providing fluid communication into said second inflatable portion, said second inflatable portion being a one-piece woven construction;
   a third inflatable portion having an opening providing fluid communication into said third inflatable portion, said third inflatable portion being a one-piece woven construction;
   a fluid dispersing conduit comprising a rigid tubular member connecting said opening of said first inflatable portion, said second inflatable portion and said opening of said third inflatable portion, said fluid dispersing conduit comprising an inlet opening configured to receive an inflation force for inflating said first inflatable portion, said second inflatable portion and said third inflatable portion, said fluid dispersing conduit traverses a gap between said first inflatable portion and said second inflatable portion and a gap between said second inflatable portion and said third inflatable portion;
   a first non-inflatable member disposed in said gap between said first inflatable portion and said second inflatable portion; and
   a second non-inflatable member disposed in said gap between said second inflatable portion and said third inflatable portion, and the first inflatable portion and the second inflatable portion are only secured to each other by the first non-inflatable member and the fluid dispersing conduit, wherein said first inflatable portion has a forward leading edge and a rearward edge and said second inflatable portion has a forward leading edge and a rearward edge, wherein said rearward edge of said first inflatable portion and said forward leading edge of said second inflatable portion are in a facing spaced relationship when the inflatable cushion is inflated and said first non-inflatable member being disposed along substantially all of the rearward edge of the first inflatable portion and along substantially all of the forward leading edge of the second inflatable portion;
   wherein a portion of said first inflatable portion proximate to said opening is sealingly engaged about a portion of said fluid dispersing conduit by a clamp and said second inflatable portion is sealingly engaged about another portion of said fluid dispersing conduit by a pair of clamps and said third inflatable portion is sealingly engaged about a further portion of said fluid dispersing conduit by another clamp.

10. The inflatable cushion as in claim 9, wherein said first non-inflatable member is secured to said first inflatable portion and said second inflatable portion after said first inflatable portion and said second inflatable portion are formed by a separate manufacturing process, and said second non-inflatable member is secured to said second inflatable portion and said third inflatable portion after said second inflatable portion and said third inflatable portion are formed by a separate manufacturing process.

11. The inflatable cushion as in claim 9, wherein said non-inflatable member is a single layer of fabric material.

12. The inflatable cushion as in claim 9, wherein said first inflatable portion has non-inflatable portions defining a plurality of chambers each being in fluid communication with each other, said second inflatable portion has non-inflatable portions defining a plurality of chambers each being in fluid communication with each other, and said third inflatable portion has non-inflatable portions defining a plurality of chambers each being in fluid communication with each other.

13. The inflatable cushion as in claim 9, wherein said rigid tubular member is formed of a PVC pipe or a metal pipe and a portion of said fluid dispersing conduit disposed within said second inflatable portion comprises a plurality of diffuser openings.

14. The inflatable cushion as in claim 9, wherein said first non-inflatable member is a single layer of fabric material and the inflatable cushion is configured such that said first non-inflatable member traverses a first pillar of the vehicle and said second non-inflatable member traverses a second pillar of the vehicle and said first inflatable portion, said second inflatable portion and said third inflatable portion each traverse a window opening of the vehicle.

15. An inflatable cushion for deployment along an interior side of a vehicle, comprising:
   a first inflatable portion having a first opening providing fluid communication into a low permeable inflation chamber of said first inflatable portion;
   a second inflatable portion having a first opening providing fluid communication into a low permeable inflation chamber of said second inflatable portion;
   a fluid dispersing conduit comprising a rigid tubular member connecting the opening of said first inflatable portion and the opening of said second inflatable portion, said fluid dispersing conduit traverses a gap between said first inflatable portion and said second inflatable portion; and
   a non-inflatable member disposed in said gap between said first inflatable portion and said second inflatable portion, wherein the first inflatable portion and the second inflatable portion are only secured to each other by the non-inflatable member and the fluid dispersing conduit, wherein said first inflatable portion has a forward leading edge and a rearward edge and said second inflatable portion has a forward leading edge and a rearward edge, wherein said rearward edge of said first inflatable portion and said forward leading edge of said second inflatable portion are in a facing spaced relationship when the inflatable cushion is inflated and said non-inflatable member being disposed along substantially all of the rearward edge of the first inflatable portion and along substantially all of the forward leading edge of the second inflatable portion;

wherein a portion of said first inflatable portion proximate to said opening is sealingly engaged about a portion of said fluid dispersing conduit by a clamp and a portion of said second inflatable portion proximate to said opening is sealingly engaged about another portion of said fluid dispersing conduit by another clamp.

* * * * *